US012734493B2

(12) United States Patent
Meza et al.

(10) Patent No.: US 12,734,493 B2
(45) Date of Patent: Sep. 15, 2026

(54) IN-LINE GAS LIQUID INFUSION SMART SYSTEM

(71) Applicant: FLOW CONTROL LLC, Beverly, MA (US)

(72) Inventors: Humberto V. Meza, Trabuco Canyon, CA (US); Derrick Tran, Yorba Linda, CA (US); Jesus Estrada, Gloucester, MA (US); Akshaykumar Patel, Santa Ana, CA (US)

(73) Assignee: FLOW CONTROL LLC, Beverly, MA (US)

( * ) Notice: Subject to any disclaimer, the term of this patent is extended or adjusted under 35 U.S.C. 154(b) by 138 days.

(21) Appl. No.: 17/013,955

(22) Filed: Sep. 8, 2020

(65) Prior Publication Data

US 2021/0069656 A1 Mar. 11, 2021

Related U.S. Application Data

(60) Provisional application No. 62/896,795, filed on Sep. 6, 2019.

(51) Int. Cl.
*B01F 35/22* (2022.01)
*B01F 23/236* (2022.01)
(Continued)

(52) U.S. Cl.
CPC ...... *B01F 35/2205* (2022.01); *B01F 23/2363* (2022.01); *B01F 35/2113* (2022.01);
(Continued)

(58) Field of Classification Search
CPC .......... B01F 23/2363; B01F 23/237621; B01F 23/23765; B01F 35/2205; B01F 35/22162;
(Continued)

(56) References Cited

U.S. PATENT DOCUMENTS 4,745,853 A * 5/1988 Hoover ............... B01F 35/2112 261/DIG. 7
6,807,460 B2 10/2004 Black et al.
(Continued)

FOREIGN PATENT DOCUMENTS

WO 2006/066338 A1 6/2006
WO 2009/032941 A2 3/2009
(Continued)

OTHER PUBLICATIONS

"Smart Dispensing" Sestra Systems, sestrasystems.com, Jun. 9, 2017; https://web.archive.org/web/20170709212016/http://www.sestrasystems.com; pp. 1-9.
(Continued)

*Primary Examiner* — Charles S Bushey
(74) *Attorney, Agent, or Firm* — William J. Barber; WARE FRESSOLA MAGUIRE & BARBER LLP

(57) ABSTRACT

An in-line gas liquid infusion smart system, featuring a controller having a signal processer configured to receive signaling containing information about parameters or settings related to dispensing a non-infused liquid and a gas-infused mixture of gas and liquid from a dispense point; and determine corresponding signaling containing information to dispense the non-infused liquid and the gas-infused mixture from the dispense point, and also containing further information about the parameters or settings for providing to a remote controller for controlling, monitoring or troubleshooting the in-line gas liquid infusion smart system, based upon the signaling received.

6 Claims, 4 Drawing Sheets

Example of system wiring diagram using a motor driven pump

(51) Int. Cl.

| | |
|---|---|
| ***B01F 35/21*** | (2022.01) |
| ***B01F 35/212*** | (2022.01) |
| ***B01F 35/221*** | (2022.01) |
| *B01F 23/237* | (2022.01) |
| *B01F 101/14* | (2022.01) |
| *B01F 101/15* | (2022.01) |
| *B01F 101/16* | (2022.01) |

(52) U.S. Cl.
CPC ........ *B01F 35/2114* (2022.01); *B01F 35/212* (2022.01); *B01F 35/22162* (2022.01); *B01F 23/237621* (2022.01); *B01F 23/23765* (2022.01); *B01F 2101/14* (2022.01); *B01F 2101/15* (2022.01); *B01F 2101/16* (2022.01)

(58) Field of Classification Search
CPC ................ B01F 35/212; B01F 35/2113; B01F 35/2114; B01F 2101/14; B01F 2101/15; B01F 2101/16
USPC ............................... 261/27, 28, 34.1, DIG. 7
See application file for complete search history.

(56) References Cited

U.S. PATENT DOCUMENTS

| | | | | |
|---|---|---|---|---|
| 7,779,099 | B2 | 8/2010 | Rahgunathan et al. | |
| 8,783,513 | B2 | 7/2014 | Beavis et al. | |
| 8,910,563 | B2 * | 12/2014 | Hulett | A47J 31/0631 99/280 |
| 9,233,824 | B2 | 1/2016 | Kirschner et al. | |
| 9,243,830 | B2 | 1/2016 | Chadwell et al. | |
| 9,386,782 | B2 | 7/2016 | Choi et al. | |
| 9,801,405 | B2 | 10/2017 | Kleinrichert | |
| 9,809,437 | B2 | 11/2017 | Tansey, Jr. | |
| 9,955,710 | B2 | 5/2018 | Hyde et al. | |
| 10,155,650 | B2 | 12/2018 | Petermann | |
| 10,182,587 | B2 | 1/2019 | Lundberg et al. | |
| 10,252,900 | B2 | 4/2019 | Cook | |
| 10,258,952 | B2 | 4/2019 | Dove et al. | |
| 10,730,735 | B2 * | 8/2020 | Cook | B67D 1/1252 |
| 11,266,956 | B2 * | 3/2022 | Perkins | B01F 23/2363 |
| 2006/0113322 | A1 | 6/2006 | Maser et al. | |
| 2012/0059513 | A1 | 3/2012 | Perkins et al. | |
| 2013/0001249 | A1 | 1/2013 | Wiemer et al. | |
| 2014/0175125 | A1 | 6/2014 | Breault | |
| 2015/0024088 | A1 | 1/2015 | Cohen et al. | |
| 2015/0329343 | A1 * | 11/2015 | Kleinrchert | B67D 1/0406 222/146.6 |
| 2016/0222332 | A1 | 8/2016 | Peirsman et al. | |
| 2017/0164643 | A1 * | 6/2017 | Lundberg | B67D 1/0073 |
| 2017/0190555 | A1 | 7/2017 | Green et al. | |
| 2018/0085723 | A1 | 3/2018 | Perkins et al. | |
| 2018/0132507 | A1 | 5/2018 | Siegel et al. | |
| 2018/0280896 | A1 | 10/2018 | Perkins et al. | |
| 2019/0270630 | A1 | 9/2019 | Dahan et al. | |
| 2020/0122994 | A1 * | 4/2020 | Cimatti | B67D 1/0034 |
| 2020/0316534 | A1 * | 10/2020 | Patel | B01F 23/236 |
| 2021/0069655 | A1 * | 3/2021 | Patel | B01F 23/236 |

FOREIGN PATENT DOCUMENTS

| | | | |
|---|---|---|---|
| WO | 2011/000021 | A1 | 1/2011 |
| WO | 2016/054050 | A1 | 4/2016 |
| WO | 2018/204454 | A1 | 11/2018 |
| WO | 2018/236758 | A1 | 12/2018 |

OTHER PUBLICATIONS

"Brood Nitro V2PX Operations Manual V2.2 Eng", Rhino Coffee Gear, rhinocoffeegear.com, [Document Modified: May 2, 2020 3:59:55 PM]; https://rhinocoffeegear.com/attachments/Nitro_V2PX_Operation_Manual.pdf; pp. 1-9.

"SBC6950SNCF", Summit, summitappliance.com, Apr. 14, 2019; https://web.archive.org/web/20190414080429/https://www.summitappliance.com/catalog/model/SBC695OSNCF; pp. 1-15.

* cited by examiner

*FIG. 1*: Example of system wiring diagram using a motor driven pump

*FIG. 2*: Example of system plumbing diagram using a motor driven pump

*FIG. 3*: Example of system plumbing diagram using an air driven diaphragm pump

IN-LINE GAS LIQUID INFUSION SMART SYSTEM

CROSS-REFERENCE TO RELATED APPLICATION

This application claims benefit to provisional patent application Ser. No. 62/896,795, filed 6 Sep. 2019, which is hereby incorporated by reference in its entirety.

BACKGROUND OF THE INVENTION

1. Field of the Invention

The present invention relates to a gas liquid infusion system, e.g., for mixing, infusing or carbonating beverage liquids (such as coffee, tea, milk, soda, beer, wine, spirits and industrial fluids) with a gas (such as nitrogen (N2), or carbon dioxide (CO2), or a blend of N2 and CO2).

2. Brief Description of Related Art

The following dispensing systems are known in the art and dispense infused coffee through their proprietary mixing devices without any monitoring/controlling and data communication means.

- Bunn Nitron Cold Brew (See https://www.bunn.com/Iced and Cold Draft Coffee);
- Cornelius Nitropro (See http://nitropro-comellus.com/);
- Joetap (See http://joetap.com/home/); and
- Micromatic (See https://www.micromatic.com/nitro-cold-brew-coffee-on-tap).

Shortcomings of the Above Mentioned Devices:

The above mentioned systems lack the following:

- Consistency in drink quality,
- System component operating data collection,
- Remote monitoring/controlling,
- Data communication/IoT connectivity, and
- Flexibility/customization.

There is a need in the industry for a better way to infuse gas and liquid for dispensing beverages in restaurants, coffee shops, bars, and convenience stores, etc.

SUMMARY OF THE PRESENT INVENTION

In summary, the present invention provides smart infusion systems that utilize available devices like one or more pressure sensors, liquid detection devices, flow meters, gas fittings/orifices, and electronics control boards to monitor and control the desired outputs of the mixtures. They also provide data communication through local networks or IoT devices for either technical or business data collection and analysis; it also provides the means to troubleshoot, monitor and control the systems remotely.

Particular Embodiments

By way of example, and according to some embodiments, the present invention may include, or take the form of, an in-line gas liquid infusion smart system featuring a controller having a signal processer configured to

- receive signaling containing information about parameters or settings related to dispensing a non-infused liquid and a gas-infused mixture of gas and liquid from a dispense point; and
- determine corresponding signaling containing information to dispense the non-infused liquid and the gas-infused mixture from the dispense point, and also containing further information about the parameters or settings for providing to a remote controller for controlling, monitoring or troubleshooting the in-line gas liquid infusion smart system, based upon the signaling received.

Other Features

The in-line gas liquid infusion smart system may include one or more of the following features:

The controller may be configured to provide the corresponding signaling as control signaling to control components of the in-line gas liquid infusion smart system in order to dispense the non-infused liquid and the gas-infused mixture from the dispense point, as well as data communication signaling to the remote controller.

The in-line gas liquid infusion smart system may include the remote controller that is configured to:

- receive the corresponding signaling, and
- provide remote controller signaling containing further corresponding information about controlling, monitoring or troubleshooting the components in the in-line gas liquid infusion smart system, including changing one or more of the parameters or settings related to the operation of the components in the in-line gas liquid infusion smart system; and
- the controller may be configured to receive the remote controller signaling and determine the corresponding signaling to dispense the non-infused liquid and the gas-infused mixture from the dispense point, based upon the remote controller signaling received, e.g., including changing the one or more of the parameters or settings related to the operation of the components in the in-line gas liquid infusion smart system.

The controller may be configured to exchange the signaling and the corresponding signaling with the remote controller through a local network gateway to a cloud server, including exchanging the data communication signaling.

The parameters or settings may include gas-liquid infusion settings, pump operating parameters, dispense information and system parameters.

The pump operating parameters may include speed, voltage, current and pressure of a pump providing the non-infused liquid to a gas liquid absorption device (GLAD);

- the dispense information may include a pour time stamp and a type of drink of the gas-infused mixture dispensed, and a keg change of a liquid or gas processed; and
- the system parameters may include a gas pressure and a liquid pressure of the liquid or gas processed and a mode of operation of the in-line gas liquid infusion smart system.

The remote controller may be configured to

- receive the corresponding signaling; and
- determine business analysis data signaling containing information about business analysis data regarding the inline gas infusion smart system, including:
  - product consumption information,
  - power consumption information,
  - peak demand time information, and
  - inventory management information.

The remote controller may be configured to

- receive the corresponding signaling; and
- determine technical trouble shooting data signaling containing information about technical trouble shooting data for controlling the in-line gas liquid infusion smart system, including information about:
Pump behaviors and life expectancy,
Changes in system operating parameters, and
Sequences of last modes of operations.

The remote controller may be configured to
receive remote user input signaling (e.g., from a remote operator) containing information about changing one or more of the parameters or settings of one or more of the components in the in-line gas liquid infusion smart system; and
provide remote controller signaling containing further corresponding information about controlling, monitoring or troubleshooting the components in the in-line gas liquid infusion smart system, including changing one or more parameters or settings related to the operation of the components in the in-line gas liquid infusion smart system for providing to the smart controller.

The gas-infused mixture may be a gas-infused beverage; the gas may include nitrogen (N2), carbon dioxide (CO2) or a blend of both; and the gas-infused beverage may include an N2 infused beverage, a CO2 infused beverage, or a blended N2 and CO2 infused beverage.

The gas-infused mixture may be a gas-infused beverage; the non-infused liquid may include coffee, tea, milk, beer, soda, juice, water, beer, wine, or spirit; and the gas-infused beverage may include a gas-infused coffee, tea, milk, beer, soda, juice, water, beer, wine, or spirit beverage.

The in-line gas liquid infusion smart system may be an industrial system; and the gas-infused mixture may be a gas-infused industrial mixture having a desired ratio of one or more gases and/or liquids for an industrial process application.

The components may include a GLAD configured to receive the non-infused liquid from a liquid source, receive one or more gases from one or more gas sources, and provide the gas-infused mixture to the dispense point.

The liquid source may include a pump, including a motor driven or air driven diaphragm pump, configured to pump the non-infused liquid to the GLAD, including where the motor driven or air driven diaphragm pump responds to the control signaling and pumps the non-infused liquid to the GLAD.

The components may include a gas solenoid valve configured to provide a gas from a gas source for driving the gas driven diaphragm pump, including where the gas solenoid valve responds to the control signaling and provides the gas from the gas source for driving the gas driven diaphragm pump.

The components may include a gas pressure sensor configured to provide gas pressure sensor signaling containing information about the pressure of the gas provided for driving the gas driven diaphragm pump, including where the gas pressure sensor provides the gas pressure sensor signaling to the controller.

The components may include tubing configured to provide and recycle an exhaust gas provided from the gas driven diaphragm pump to a gas source providing the gases.

The components may include one or more gas solenoid valves configured to provide the one or more gases from the one or more gas sources to the GLAD, including where the one or more gas solenoid valves responds to the control signaling and provides the one or more gases from the one or more gas sources to the GLAD.

The components may include one or more gas pressure sensors configured to provide gas pressure sensor signaling containing information about one or more gas pressures of the one or more gases provided to the GLAD, including where the one or more gas pressure sensors provides the gas pressure sensor signaling containing information about the one or more gas pressures of the one or more gases provided to the GLAD to the controller.

The components system may include a non-infused liquid solenoid valve configured to provide the non-infused liquid from the GLAD to the dispense point, and may also include a mixture solenoid valve configured to provide the gas-infused mixture to the dispense point, including where the non-infused liquid solenoid valve respond to the control signaling and provides the non-infused liquid from the GLAD to the dispense point, and also including where the mixture solenoid valve responds to the control signaling and provides the gas-infused mixture to the dispense point.

The components may include a liquid flow sensor arranged between the motor driven pump and the pressurized liquid container/bag-in-box (BIB)/bottle configured to provide liquid flow sensor signaling containing information about the liquid flow from the pressurized liquid container/bag-in-box (BIB)/bottle to the motor driven pump, including where the liquid flow sensor provides the liquid flow sensor signaling to the controller.

The Controller

By way of further example, and according to some embodiments, the present invention may include, or take the form of, a controller for an in-line gas liquid infusion smart system, featuring a signal processer configured to:
receive signaling containing information about parameters or settings related to dispensing a non-infused liquid and a gas-infused mixture of gas and liquid from a dispense point; and
determine corresponding signaling containing information to dispense the non-infused liquid and the gas-infused mixture from the dispense point, and also containing further information about the parameters or settings for providing to a remote controller for controlling, monitoring or troubleshooting the in-line gas liquid infusion smart system, based upon the signaling received.

BRIEF DESCRIPTION OF THE DRAWING

The drawing, which is not necessarily drawn to scale, includes the following Figures.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

Figure 1:
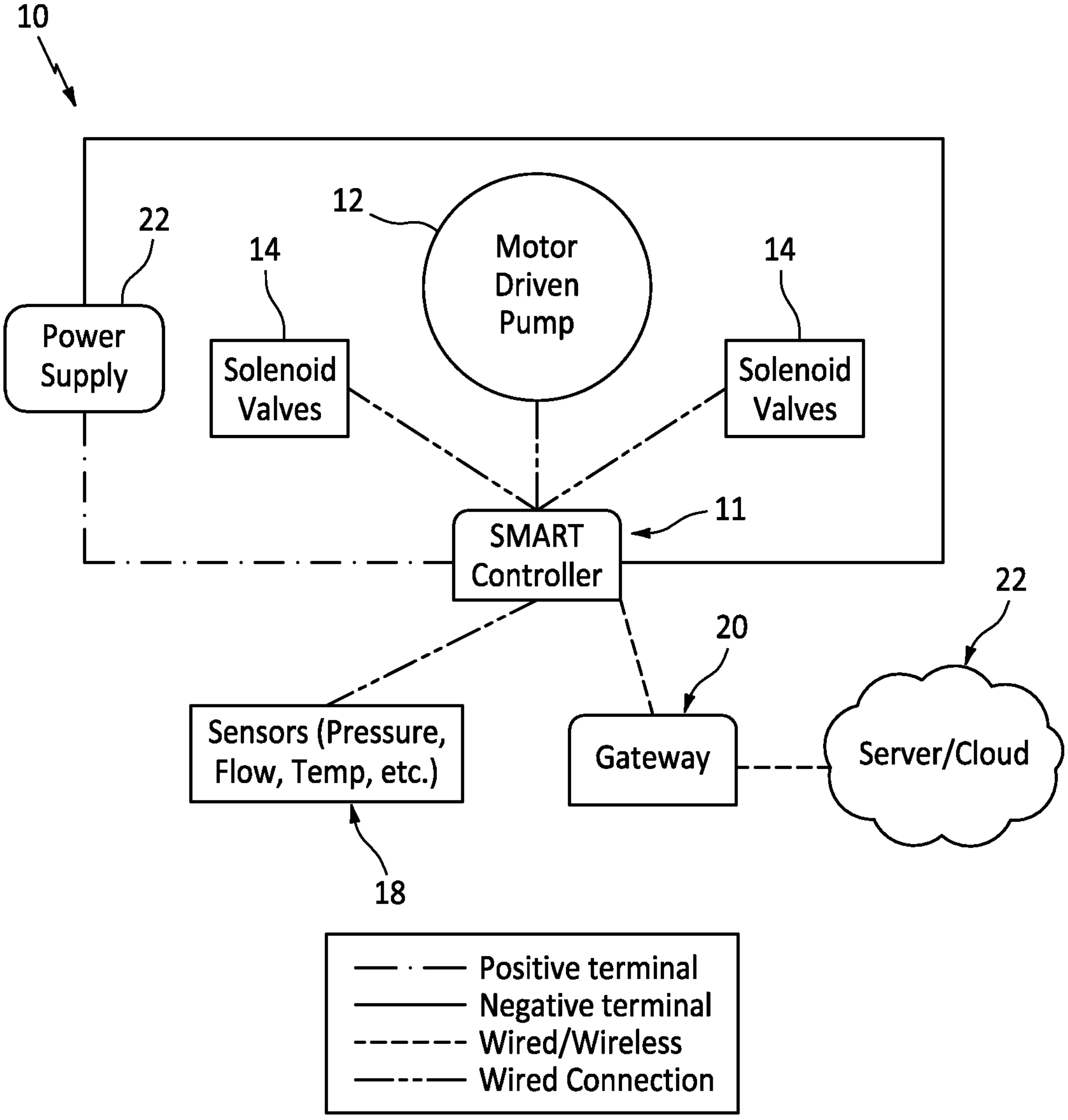
FIG. 1 is an example of a system wiring diagram using a motor driven pump, e.g., for an in-line gas liquid infusion smart system having a smart controller configured to receive parameter and setting signaling from, and provide control signaling to, some combination of the motor driven pump, solenoid valves, sensors (pressure, flow and temperature, etc.), and a local network gateway for providing parameters or settings related to the operation of the in-line gas liquid infusion smart system to a server/cloud, as well as to dispense a gas-infused mixture from the in-line gas liquid infusion smart system, according to some embodiments of the present invention.
Figure 2:
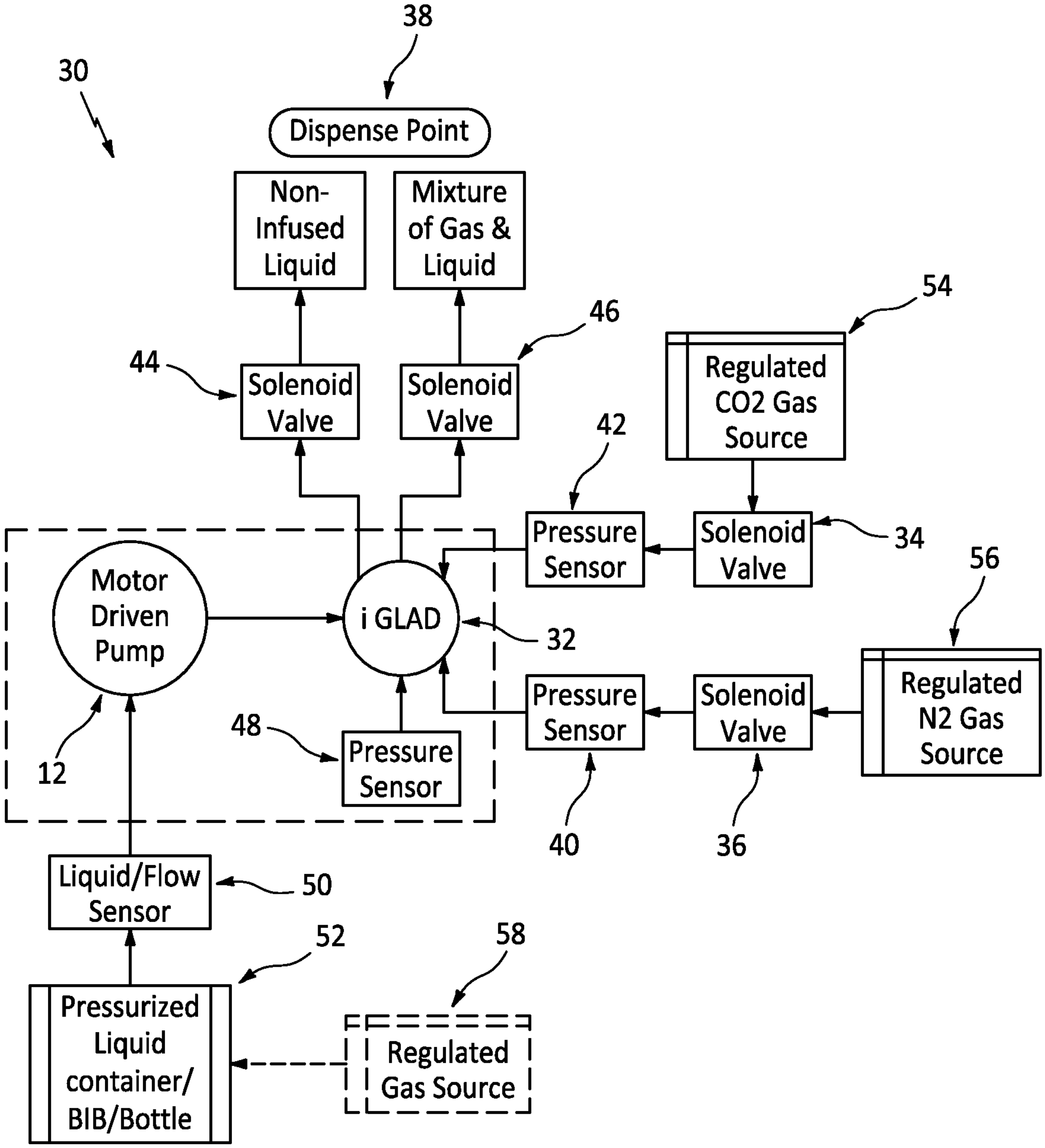
FIG. 2 is another example of a system plumbing diagram using a motor driven pump, e.g., for an in-line gas liquid infusion smart system having a GLAD configured to receive one or more gases from one or more solenoid valves and a non-infused liquid from the motor driven pump, and provide the non-infused liquid and a mixture of the gas and liquid to a dispense point to dispense a gas/liquid infused drink or beverage, according to some embodiments of the present invention.
Figure 3:
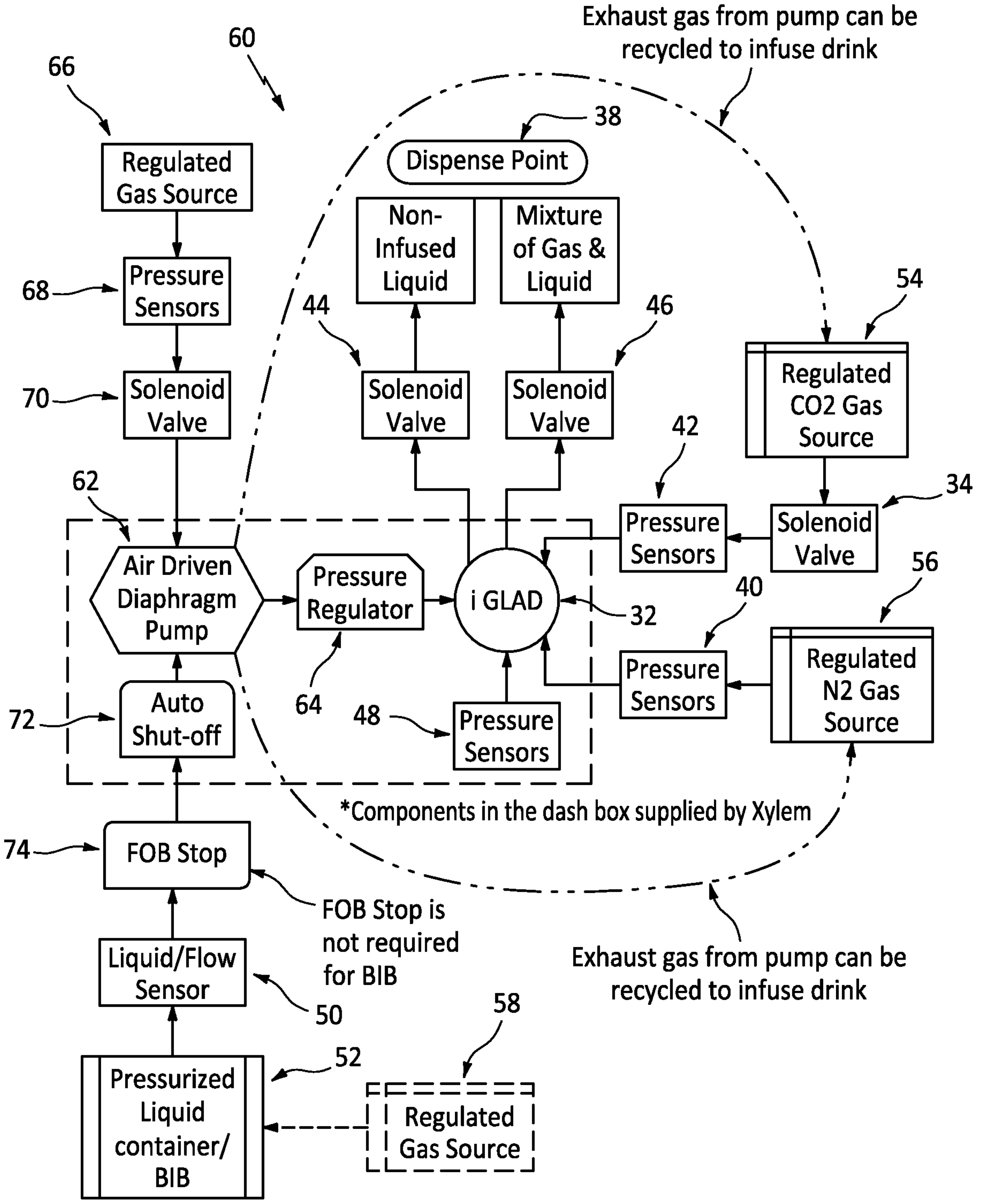
FIG. 3 is still another example of a system plumbing diagram using an air driven diaphragm pump, e.g., for an in-line gas liquid infusion smart system having a GLAD configured to receive one or more gases from one or more solenoid valves and a non-infused liquid from the motor driven pump, and provide the non-infused liquid and a mixture of the gas and liquid to a dispense point to dispense a gas/liquid infused beverage, where exhaust gas from the air driven diaphragm pump can be recycled to infuse the gas/liquid infused drink or beverage, according to some embodiments of the present invention.

In general, FIGS. 1, 2 and 3 show diagrams of infusion plumbing systems using a motor or air operating pump, according to some embodiments of the present invention. A smart controller like that shown in FIG. 1 forms part of each system and adds data communication capability to the respective system, which allows communication through a local network gateway to a cloud server for transfer of information, e.g., for implementing remote monitoring and control of the infusion plumbing systems.

Below are some examples of a list of information that the infusion plumbing systems can transfer to the cloud server:

- A Gas-Liquid Infusion setting, e.g., for controlling components of the inline gas liquid infusion smart system,
- Pump operating parameters: Speed, Voltage, Current and Pressure, e.g. for controlling the pump,
- Dispense information: Pour time stamp, type of drink and keg change, and
- System parameters: Gas pressure, Liquid pressure and Mode of operation.

Based on information collected on the server/cloud, infusion plumbing system usage information can be calculated for business analysis and technical troubleshooting. The following are some of the examples for business analysis data:

- Product consumption information,
- Power consumption information,
- Peak demand time information, and
- Inventory management information.

The following are some of the examples for technical troubleshooting data:

- Pump behaviors and life expectancy,
- Changes in system operating parameters, and
- Sequence of last modes of operations,

FIG. 1

In particular, and by way of example, FIG. 1 shows an in-line gas liquid infusion smart system generally indicated as 10 having a smart controller 11 configured to receive parameter and setting signaling from, and provide control signaling to, some combination of the motor driven pump 12, solenoid valves 14, 16, sensors 18 (e.g., including for sensing pressure, flow and temperature, etc.), and a local network gateway 20 that provides gateway signaling containing information about parameters or settings related to the operation of the in-line gas liquid infusion smart system 10 to a server/cloud 22, consistent with that set forth herein. The smart controller 11 is configured to provide the control signaling to control components of the in-line gas liquid infusion smart system 10 in order to dispense a gas-infused mixture from a dispense point 38 (FIGS. 2 and 3), also consistent with that set forth herein. The in-line gas liquid infusion smart system 10 includes a power supply 23, e.g., to provide power to the components, including the smart controller 11 as shown. In FIG. 1, wired connections are shown as solid lines, and wireless connections are shown as dotted lines.

FIG. 2

FIG. 2 shows an in-line gas liquid infusion smart system generally indicated as 30 having a GLAD 32 configured to receive one or more gases (e.g., CO2 and/or N2) from one or more solenoid valves 34, 36 and a non-infused liquid (e.g., coffee or tea) from the motor driven pump 12, and provide the non-infused liquid and a mixture of the gas and liquid to a dispense point 38 to dispense a gas/liquid infused drink or beverage. The in-line gas liquid infusion smart system 30 may include pressure sensors 40, 42 configured to sense the gas pressure of the one or more gases (e.g., CO2 and/or N2) provided from the one or more solenoid valves 34, 36 to the GLAD 32. The in-line gas liquid infusion smart system 30 may include non-infused liquid valve 44 and mixture solenoid valve 46 configured to provide the non-infused liquid and the mixture of gas and liquid to the dispense point 38. The in-line gas liquid infusion smart system 30 may include a GLAD pressure sensor 48 configured to sense the pressure of the one or more gases, the non-infused liquid and the mixture of gas and liquid being processed by the GLAD 32. The in-line gas liquid infusion smart system may include a liquid/flow sensor 50 configured to sense the flow of the non-infused liquid provided from a pressurized liquid container, box-in-bag (BIB) or bottle 52 to the GLAD 32. The in-line gas liquid infusion smart system may include regulated gas sources 54, 56, 58, e.g. for providing regulated gas, such as CO2, N2 or air to the one or more solenoid valves 34, 36 and/or the pressurized liquid container, box-in-bag (BIB) or bottle 52.

In operation, and by way of example, the smart controller like element 12 in FIG. 1 may be configured to received the parameter and setting signaling from some combination of the motor driven pump 12, solenoid valves 34, 36, sensors 40, 42, 48, 50; and may also be configured to provide the control signaling to the solenoid valves 34, 36, 44, 46, motor driven pump 12, and dispense point 38 to dispense the gas/liquid infused drink or beverage.

FIG. 3

FIG. 3 shows an in-line gas liquid infusion smart system generally indicated as 60, e.g., having an air driven diaphragm pump 62, as well as many similar parts or components as the system 30 in FIG. 2 that are labeled with similar reference numerals and labels for consistency.

In FIG. 3, the in-line gas liquid infusion smart system 60 may include a pressure regulator 64 arranged between the GLAD 32 and the air driven diaphragm pump 62 and configured to regulate the pressure of the non-infused liquid provided from the air driven diaphragm pump 62 to the GLAD 32. The in-line gas liquid infusion smart system 60 may include a combination of a regulated gas source 66, one or more pressure sensors 68 and a solenoid valve 70 configured to provide a gas (e.g. such as air) to drive the air driven diaphragm pump 62. The in-line gas liquid infusion smart system 60 may include a combination of an auto shut off 72 and an FOB stop 74 arranged between the liquid/flow sensor 50 and the air driven diaphragm pump 62 and configured to provide automatic shutoff and FOB stop functionality in relation to the non-infused liquid provided from the pressurized liquid container or bottle 52 to the air driven diaphragm pump 62. The FOB stop is not required for BIB implementations.

In operation, and by way of example, the smart controller like element 11 (FIG. 1) may be configured to receive the parameter and setting signaling from some combination of the air driven diaphragm pump 62, solenoid valves 34, 36, 70, sensors 40, 42, 48, 50, 68, auto shut off 72, and FOB stop 74; and may also be configured to provide the control signaling to the solenoid valves 34, 44, 46, 72, air driven diaphragm pump 62, and dispense point 38 to dispense the gas/liquid infused drink or beverage.

In contrast to that shown in FIG. 2, the system 60 in FIG. 3 does not include a solenoid like element 36; however, the system 60 may be implemented with such a solenoid like element 36.

FIG. 4

Figure 4:
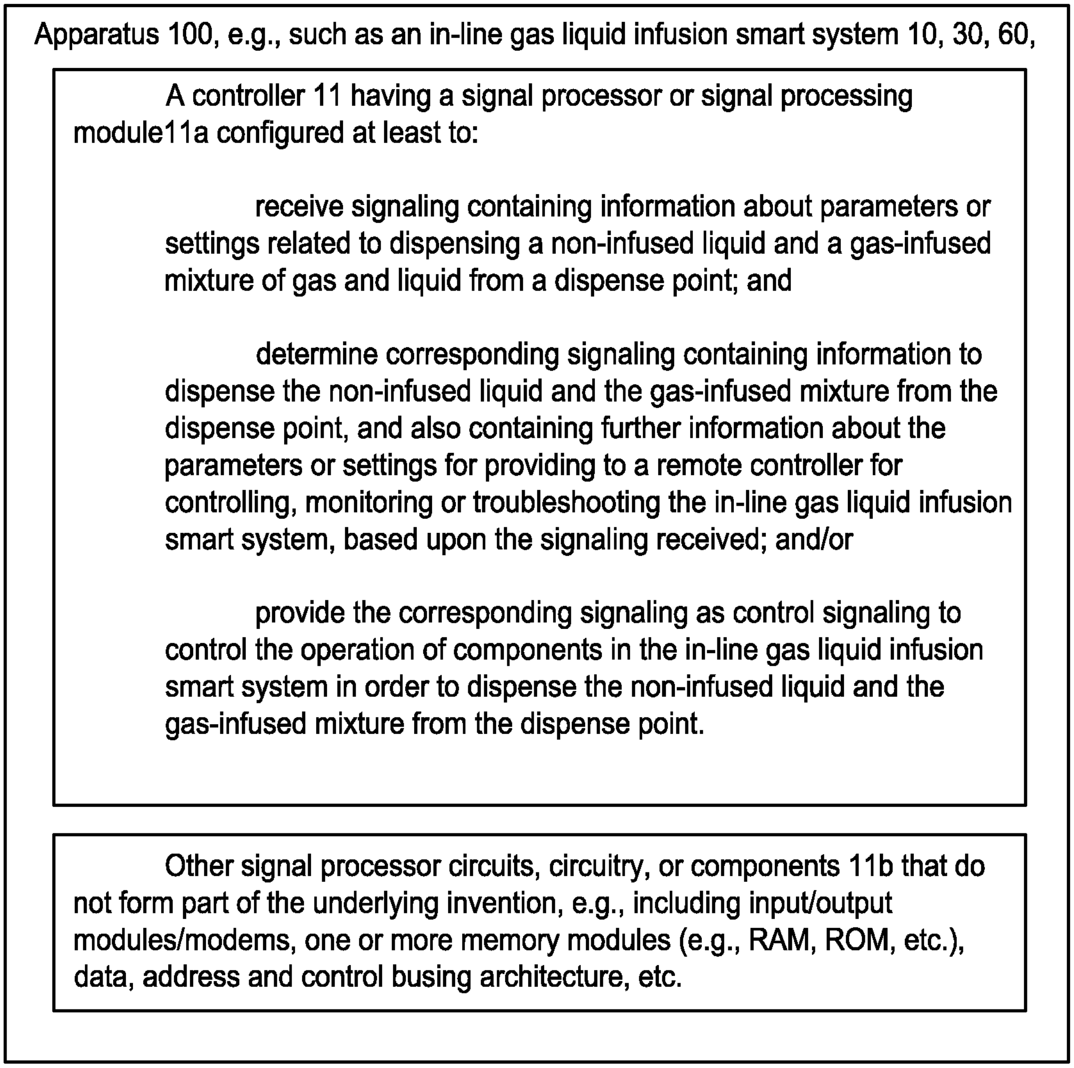
FIG. 4 is a block diagram of apparatus, according to some embodiments of the present invention, e.g., including an in-line gas liquid infusion smart system like that shown in FIGS. 1-3 having a controller or smart controller configured to implement the underlying signal processing functionality.

FIG. 4 shows a block diagram of apparatus generally indicated as 100, e.g. that may include or take the form of the in-line gas liquid infusion smart system like elements 10, 30, or 60, having the controller 11 with a signal processor or signal processing module 11*a* configured at least to:

- receive signaling containing information about parameters or settings related to dispensing a non-infused liquid and a gas-infused mixture of gas and liquid from a dispense point;
- determine corresponding signaling containing information to dispense the non-infused liquid and the gas-infused mixture from the dispense point, and also containing further information about the parameters or settings for providing to a remote controller for controlling, monitoring or troubleshooting the in-line gas liquid infusion smart system, e.g., that forms part of the server/cloud 22, based upon the signaling received; and/or
- provide the corresponding signaling as control signaling to control the operation of components in the in-line gas liquid infusion smart system in order to dispense the non-infused liquid and the gas-infused mixture from the dispense point.

The apparatus 100 may include other signal processor circuits, circuitry, or components 11*b* that do not form part of the underlying invention, e.g., including input/output modules/modems, one or more memory modules (e.g., RAM, ROM, etc.), data, address and control busing architecture, etc.

Possible Applications

By way of example, the in-line gas liquid infusion smart systems 10, 30, 60 are used for providing gas (N2, CO2, N2+CO2) infused beverages such as coffee, tea, milk, beer, soda, juice, water, beer, wine, spirit, etc. These in-line gas liquid infusion smart systems 10, 30, 60 can also be used to mix different gases and/or liquids to a desired ratio for industrial process applications.

By way of further example, the in-line gas liquid infusion smart system 10, 30, 60 may include, or take the form of, a commercial beverage dispensing machine in restaurants, coffee shops, bars, and convenience stores, etc., as well as an industrial dispensing machine.

GLAD 32

GLAD like element 32 are known in the art, and the scope of the invention is not intended to be limited to any particular type or kind thereof either now known or later developed in the future.

By way of example, see U.S. Pat. No. 11,835,148, which claims benefit to provisional patent application Ser. No. 62/848,148, filed 15 May 2019, which is assigned to the assignee of the instant application, and which is hereby incorporated by reference in its entirety.

By way of example, see U.S. Pat. No. 11,498,036, which claims benefit to provisional patent application Ser. No. 62/823,841, filed 26 Mar. 2019, which is assigned to the assignee of the instant application and discloses an example of a GLAD, and which is hereby incorporated by reference in its entirety.

By way of further example, see also U.S. Pat. No. 11,266,956, which claims benefit to Ser. No. 62/477,745, filed 28 Mar. 2017, entitled "Gas/liquid infusion system with intelligent level management and adjustable absorption output," which is hereby incorporated by reference in its entirety.

By way of still further example, see also U.S. Pat. No. 9,033,315, issued 19 May 2015, entitled "Adjustable in-line on demand carbonator chamber for beverage applications," which is hereby incorporated by reference in its entirety.

The Dispense Point 38

Dispense points like element 38 are known in the art, and the scope of the invention is not intended to be limited to any particular type or kind thereof either now known or later developed in the future.

By way of example, and according to some embodiments, the dispense point 38 may include a dispense point controller configured to receive the control signaling from the controller 11 to implement dispense point functionality related to dispensing the non-infused liquid and the gas-infused mixture, and also configured to provide dispense point controller signaling to the controller 11 containing information about the dispense point controller functionality implemented and related to dispensing the non-infused liquid and the gas-infused mixture.

Liquid and Gas Pressure Sensors and Other Devices

Liquid and gas pressure sensors and liquid flow sensors are known in the art, and the scope of the invention is not intended to be limited to any particular type or kind thereof either now known or later developed in the future.

Solenoid valves are known in the art, and the scope of the invention is not intended to be limited to any particular type or kind thereof either now known or later developed in the future.

Motor driven pumps, infusion tank/vessels, etc. are also known in the art, and the scope of the invention is not intended to be limited to any particular type or kind thereof either now known or later developed in the future.

The Scope of the Invention

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

We claim:

1. An in-line gas liquid infusion smart system, comprising:

components configured to respond to control signaling and provide a gas-infused mixture from a dispense point having a non-infused liquid and a mixture of gas and liquid;

a controller having a signal processer configured to receive signaling containing information about parameters or settings related to controlling the components in the in-line gas liquid infusion smart system and dispensing the gas-infused mixture from the dispense point, and also receive remote controller signaling containing information about changing one or more of the parameters or settings related to the operation of the components in the in-line gas liquid infusion smart system, the parameters or settings including gas-liquid infusion settings, pump operating parameters, dispense information and system parameters, and provide the control signaling, and also provide controller data communication signaling containing information about the parameters or settings related to the dispensing of the gas-infused mixture from the dispense point for controlling, monitoring and troubleshooting the in-line gas liquid infusion smart system remotely, based upon the signaling and the remote controller signaling received; and a remote controller configured to receive the controller data communication signaling, and provide the remote controller signaling containing the information to change the one or more of the parameters or settings related to the operation of the components in the in-line gas liquid infusion smart system;

the controller being is configured to exchange the controller data communication signaling and the remote controller signaling with the remote controller through a local network gateway to a cloud server; and the remote controller configured to determine business analysis data signaling containing information about business analysis data, including information about:

product consumption information, power consumption information, peak demand time information, inventory management information, and determine technical trouble shooting data signaling containing information about technical trouble shooting data for controlling the in-line gas liquid infusion smart system, including:

Pump behaviors and life expectancy,

Changes in system operating parameters, and

Sequences of last modes of operations.

2. An in-line gas liquid infusion smart system according to claim 1, wherein the components include a gas liquid absorption device (GLAD) configured to receive the non-infused liquid from a liquid source, receive one or more gases from one or more gas sources, and provide the non-infused liquid and the gas-infused mixture to the dispense point.

3. An in-line gas liquid infusion smart system according to claim 2, wherein the components comprise a gas solenoid valve configured to provide a gas from a gas source for driving a gas driven diaphragm pump.

4. An in-line gas liquid infusion smart system according to claim 2, wherein the components comprise a gas pressure sensor configured to provide gas pressure sensor signaling containing information about the pressure of the gas provided for driving a gas driven diaphragm pump.

5. An in-line gas liquid infusion smart system according to claim 2, wherein the components comprise tubing configured to provide and recycle an exhaust gas provided from a gas driven diaphragm pump to a gas source providing the gases.

6. An in-line gas liquid infusion smart system according to claim 1, wherein the pump operating parameters include speed, voltage, current and pressure of a pump providing the non-infused liquid to a gas liquid absorption device (GLAD);

the dispense information includes a pour time stamp and a type of drink of the gas-infused mixture dispensed, and a keg change of a liquid or gas processed; and the system parameters include a gas pressure and a liquid pressure of the liquid or gas processed and a mode of operation of the in-line gas liquid infusion smart system.

* * * * *